United States Patent [19]

Collins, Jr. et al.

[11] 4,272,157

[45] Jun. 9, 1981

[54] MULTI-STABLE OPTICAL SYSTEM

[75] Inventors: Stuart A. Collins, Jr., Worthington, Ohio; Uday K. Sengupta, Minneapolis, Minn.; Ulrich H. Gerlach, Columbus, Ohio

[73] Assignee: The Ohio State University, Columbus, Ohio

[21] Appl. No.: 24,603

[22] Filed: Mar. 28, 1979

[51] Int. Cl.³ .......................... G02F 1/01; G02F 1/03; G02F 1/135; G02F 1/133

[52] U.S. Cl. .............................. 350/374; 350/162 SF; 350/342

[58] Field of Search ................. 350/342, 162 SF, 150; 307/312; 331/94.5 M, 94.5 C; 356/350

[56] References Cited

U.S. PATENT DOCUMENTS

| | | | |
|---|---|---|---|
| 3,431,437 | 3/1969 | Kosonocky | 307/312 |
| 3,439,289 | 4/1969 | Kosonocky | 307/312 |
| 3,610,731 | 10/1971 | Sekiel | 350/160 |
| 3,684,350 | 8/1972 | Wentz | 350/150 |
| 3,719,414 | 8/1970 | Wentz | 350/150 |
| 3,813,605 | 5/1974 | Szoke | 330/4.3 |
| 3,824,002 | 5/1974 | Beard | 350/342 |
| 3,941,455 | 3/1976 | O'Brien | 350/342 |

OTHER PUBLICATIONS

O'Neill, "Spatial Filtering in Optics", I.E.E. Transactions on Information Theory, IT-2, pp. 56-65, (1956).
Elias et al., "Fourier Treatment of Optical Processes", Journal of the Optical Society of America, vol. 42, No. 2, pp. 127-133 (1952).
Cutrona et al., "Optical Data Processing and Filtering Systems", IRE Transactions On Information Theory, IT-6, pp. 386-400 (1960).
D. P. Jablonowski and S. H. Lee, Restoration of Degraded Images by Composite Grating in a Coherent Optical Processor, Applied Optics, pp. 1703-1712, (Jul. 1973).
D. P. Jablonowski and S. H. Lee, "Coherent Processor with Optical Feedback", Applied Optics, p. 1306 (Jul. 1973).
D. P. Jablonowski and S. H. Lee, "Single Step Detection of Blurred Images in a Coherent Optical Processor", Applied Optics, pp. 1713-1716, (Jul. 1973).
S. H. Lee, "Mathematical Operations by Optical Processing", Optical Engineering, vol. 13, No. 3, pp. 196-207 (May/Jun. 1974).
N. C. Gallagher, Jr., "Real Time Optical Signal Processors . . . ", Applied Optics, vol. 15, No. 4, (Apr. 1976).
Grinberg et al., "Photoactivated Birafringent Liquid--Crystal Light Valve for Color Symbology Display", The IEEE, Inc., pp. 775-783 (1975).
Beard et al., "A-C Liquid Crystal Light Valve", Applied Physics Letters, vol. 22, No. 3, pp. 90-92 (1973).
D. Casasent, "Spatial Light Modulators", Proceedings of the IEEE, pp. 143-157 (Jan. 1977).
S. G. Lipson and P. Nisenson, "Imaging Characteristics of the Itek PROM", Applied Optics, vol. 13, No. 9, pp. 2052-2060 (Sep. 1974).
S. L. Lou and D. S. Oliver, "Pockels Readout Optical Memory Using $Bi_{12}SiO_{20}$", Applied Physics Letters, vol. 18, No. 8, pp. 325-328 (1970).
P. W. Smith et al., "Electrooptic Nonlinear Fabry Perot Devices", IEEE Journal of Quantum Elec. 14, pp. 207-212, (1978).
H. Wieder and R. V. Pole, "Reactive Optical Information Processing . . . ", Applied Optics, vol. 6, No. 10, pp. 1761-1765 (Oct. 1967).
P. DeSantis et al., "Optical Systems With Feedback", Optica Acta, vol. 23, 1976, pp. 505-518.
P. W. Smith and E. H. Turner, "A Bistable Fabry Perot Resonator", Applied Physics Letters, vol. 30, No. 6, Mar. 15, 1977, pp. 280, 281.
J. Grinberg et al., "A New Real Lime Non Coherent to Coherent . . . ", Optical Engineering, vol. 14, No. 3, pp. 217-225, May-Jun. 1975.
E. Garmire, J. H. Marburger and S. D. Allen, "Incoherent Mirrorless Bistable Optical Devices", Applied Physics Letters 32(5), Mar. 1, 1978.

*Primary Examiner*—Alfred E. Smith
*Assistant Examiner*—Thomas P. O'Hare
*Attorney, Agent, or Firm*—Millard & Cox

[57] ABSTRACT

A multi-stable optical device and system which utilizes an active optical element such as a spatial light modulator (SLM) in a feedback path configuration. The elementary system consists of a pair of image element (pixels) on the SLM whose input and outputs are coupled to each other by purely optical means. In another arrangement, multi-stable performance is achieved by optical path geometry defining a single pixel which performs in conjunction with a feedback path. Analysis is provided identifying the equilibrium states of the system as well as those equilibrium states which are stable in nature.

23 Claims, 18 Drawing Figures

MULTI-STABLE OPTICAL SYSTEM

BACKGROUND

Optical logic systems and the components combined to form them have represented subjects of increasing inquiry and interest on the part of the scientific community. This interest stems principally from the promise which such systems hold as an approach for significantly increasing the average processing speeds of digital data processing systems and in minimizing machine volume. In this regard, it is opined that the computational capacities of a computer might be enhanced considerably by resort to optical-digital computing systems having a capability permitting a simultaneous parallel processing of information introduced to them. Optical data processing utilizing coherent light has been extensively studied essentially since the evolution of laser. However, practical approaches for implementing such concepts have suffered severe constraints. For example the technique has represented only a special purpose processing capability, principally inasmuch as, in the past, it could not be performed in real-time. The speed of data through-put is important and such systems, historically relying upon photographic film for inputting data and for spatial filtering, have been off-line processes, thus, limiting flexibility to a great extent. Early concepts relating to coherent optical processing are presented, for example, in the following representative publications:
- I. E. L. O'Neill, I. R. E. Trans. on Infor. Theory, IT-2, Pg. 56 (1956).
- II. P. Elias, et al., J. Opt. Soc. Am. 42, Pg. 127 (1952).
- III. L. Cutrona, et al., IRE Trans. on Infor. Theory, IT-6, Pg. 386 (1960).

Current inquiries into optical information processing, in general, have looked to the use of optical feedback to evoke a variety of operations. As applied to purely electronic systems, feedback is well recognized as a procedure wherein there is combined a portion of the time varying output signal from a circuit (often after modification) with the input to that circuit to achieve a unique, temporal, frequency response characteristic. As applied to an optical information processing system the feedback procedure combines a part of the output image, usually as a two dimensional distribution of optical amplitude or intensity, typically modified, with the input image to produce a spatial as opposed to temporal frequency transfer characteristic. Optical feedback also can be used to provide nonlinear or space-variant optical processing. Over the relatively recent past, direct optical feedback in coherent optical spatial systems has been used for the purpose of image restoration, contrast control, analog computation and amplitude, as well as phase control in spatial filtering procedures. In the latter regard, reference is made to the following publications:
- IV. D. P. Jablonowski and S. H. Lee, J. Opt. Soc. Am. 63, 1306 (1973).
- V. S. H. Lee, Opt. Eng. 13, 196 (1974).
- VI. N. C. Gallagher, Appl. Opt. 15, 882 (1976).
- VII. H. Wieder and R. V. Pole, Appl. Opt. 6, 1761 (1967).

Of the above scientific endeavors, analog computation techniques are considered to be those not concerning discrete intergers but, rather, continuous operations such as those involved in taking the Fourier transforms of object images so as to reduce them to their harmonic content. The topic of optical feedback also has been considered somewhat generally in the linear systems approximation as set forth in the following publication:
- VIII. P. DeSantis, F. Gori, G. Guattari, and C. Palms, Opt. Ata. 23, 505 (1976).

Basic to all practical digital or discrete integer computational systems are bi-stable or multi-stable elements which operate in concert to treat an inflow of data in pulse form. Optical bi-stability on a single spatial element has been demonstrated by means of hybrid optical-electronic feedback to an electro-optic element inserted in a Fabry-Perot resonator. Such devices generally are limited in consequence of their capability for treating only a singular optical channel or path. To achieve a desired significant increase in information processing capability, a parallel channel optical system is required wherein digital related arithmetic operations are carried out on a simultaneous basis. To achieve this significant enhancement of processing capability, bi-stable or multi-stable system elements are required wherein no, relatively slow, electronic modulation is required within the feedback or related paths of their structures. A discussion concerning the use of electronic feedback within bi-stable single spatial elements is provided in the following publication:
- IX. P. W. Smith and E. H. Turner, Appl. Phys. Lett. 30, 280 (1977).

In the past, a device somewhat representing the optical analog to a transistor or vacuum tube has been developed. Operative with coherent or noncoherent light, these devices have been generically termed: "Spatial Light Modulators" (SLM). One such spatial light modulator consists of a sandwich of thin films upon a supportive substrate which electrically control the optical birefringence of a thin liquid crystal layer. The device is solid-state in nature and compact requiring a low, a.c. power input and is fabricable, for the most part, utilizing thin film technology. In its general operation, an input or writing light to one face of the device at a given resolution cell or pixel thereof, depending upon the voltage imposed thereupon, alters the optical birefringence of its output. Inasmuch as a relatively great number of minute channels or pixels are defined about the surface of the SLM, it is capable of simultaneously actively operating along each of those channels. Other SLMs are available as active elements which operate upon incident light in alternate ways, for example, by varying the amplitude of incident light in response to a controlling light input. For further information concerning spatial light modulators, reference is made to the following publications:
- X. J. Grinberg, A. Jacobson, W. Bleha, L. Miller, L. Fraas, D. Boswell and G. Myer, Optical Engineering Vol. 14 No. 3 (1975)
- XI. Photoactivated Birefringent Liquid-Crystal Light Valve for Color Symbology Display; J. Grinberg, W. Bleha, A. Jacobson, A. Lackner, G. Myer, L. Miller, D. Margerum, L. Fraas and D. Boswell, The Institute of Electrical & Electronics Engineers, Inc. (1975).
- XII. AC Liquid-Crystal Light Valve; T. Beard, W. Bleha & S. Wong, Appl. Phys. Lett., Vol. 22, No. 3 (1973).
- XIII. Spatial Light Modulators; D. Casasent, Proceedings of the IEEE (1977).

XIV. Imaging Characteristics of the Itek PROM; S. Lipson & P. Nisenson, Applied Optics, Vol. 13, No. 9 (1974).

SUMMARY

The present invention is addressed to a multi-stable optical system and to a device incorporating such system which, operating in conjunction with a source of either incoherent or coherent light, achieves multi-stable performance permitting its use within a broad spectrum of optical logic and computing systems. In the latter regard, the system of the invention will find side application to high information density, parallel processing and for optical logic-numerical computing systems.

One aspect and object of the invention is to provide a multi-stable optical system incorporating an active optical spatial element having input and output sides for treating light from a source at its output side to derive light thereat at an intensity, $I_1$, which occurs in response to light of intensity, $I_2$, incident at the input side of the element. The system further includes an optical path which directs light from the source to the active optical spatial element output side and, additionally, directs light treated at that output side along a feedback path to the input side of the element. With this arrangement, the active optical spatial element, operating in conjunction with the optical path, exhibits an operational characteristic represented by the expression:

$$\tau(dI_1/dt) + I_1 = \Psi(I_2)$$

$$\tau'(dI_2/dt) + I_2 = \theta(I_1)$$

where $\tau$ and $\tau'$ are relaxation times.

As another aspect of the invention, the multi-stable optical system exhibits equilibrium states which may be defined by solutions of the following simultaneous equations:

$$I_1 = \Psi(I_2)$$

$$I_2 = \theta(I_1)$$

Of such equilibrium states, those which are stable are present under conditions wherein:

$$\theta'\Psi' < 1$$

where $\theta' = d\theta(I_1)/dI_1$ and $\Psi' = d\Psi(I_2)/dI_2$, each evaluated at an equilibrium state. The systems of the invention may be switched from one stable equilibrium state to another by transiently altering the light intensity incident at the input to the active optical spatial element input side by an amount which is catastrophic to any existing stable equilibrium state.

This transient alteration serves to evoke a transformation of the system to another equilibrium state. Intensity alteration to carry out the switching may be effected by temporarily increasing light intensity at an otherwise dark input to the active optical spatial element or, alternately, by transiently blocking light to that input.

As another object and feature of the invention, the active optical spatial element may be present within a multi-stable optical device as a spatial light modulator (SLM) which is arranged to receive input polarized light along first and second paths and serves to define corresponding first and second pixels with such paths. The spatial light modulator (SLM) alters the polarization of the incoming light at these first and second pixels in correspondence with the intensity of light incident upon these pixels at the opposite or input side of the SLM. Operating in a reflective mode, the SLM reflects the thus altered or unaltered light along respective third and fourth optical paths which incorporate analyzers for polarizing the light within those paths transversely with respect to the initial input polarization characteristic of the light. That light which is passed through the analyzers is fed to the SLM input side at the first and second pixels such that the output of the first pixel is directed to the input of the second pixel and vice versa. With the arrangement above described, one SLM pixel, performing in association with the polarized and analyzed light within the optical path associated therewith exhibits an operational characteristic represented by the equation:

$$\tau(dI_1/dt) + I_1 = \Psi(I_2)$$

and the second pixel, operating with polarized and analyzed light within its associated optical path exhibits an operational characteristic represented by the equation:

$$\tau(dI_2/dt) + I_2 = \Psi(I_1)$$

where $I_1$ and $I_2$ are the intensities of light incident upon the respective first and second pixels at the input side of the SLM and, $\tau$, represents a relaxation time. Such an optical device will have equilibrium states which are defined by solutions of the simultaneous equations:

$$I_1 = \Psi(I_2)$$

$$I_2 = \Psi(I_1)$$

and each one of the equilibrium states is present when:

$$\Psi_1'\Psi_2' < 1$$

wherein $\Psi_1' = d\Psi(I_1)/dI_1$ and $\Psi_2' = d\Psi(I_2)/dI_2$, evaluated at an equilibrium state.

Another object of the invention is to provide a system and devices incorporating such system wherein bi-stable or multi-stable performance is achieved utilizing only a single pixel in conjunction with an optical feedback path. With such an arrangement, $\theta(I_1) = \alpha I_1$ and $\tau' = 0$ where, $\alpha$, is a constant. Additionally, each stable equilibrium state thereof is present in satisfaction of the expression $\alpha\Psi' < 1$, where $\Psi' = d\Psi(I_2)/dI_2$ evaluated at an equilibrium state.

Other objects of the invention will, in part, be obvious and will, in part, appear hereinafter.

The invention, accordingly, comprises the apparatus and system possessing the construction, combination of elements and arrangement of parts which are exemplified in the following detailed disclosure. For a fuller understanding of the nature and objects of the invention, reference should be had to the following detailed description taken in connection with the accompanying drawings.

DETAILED DESCRIPTION

Figure 1:
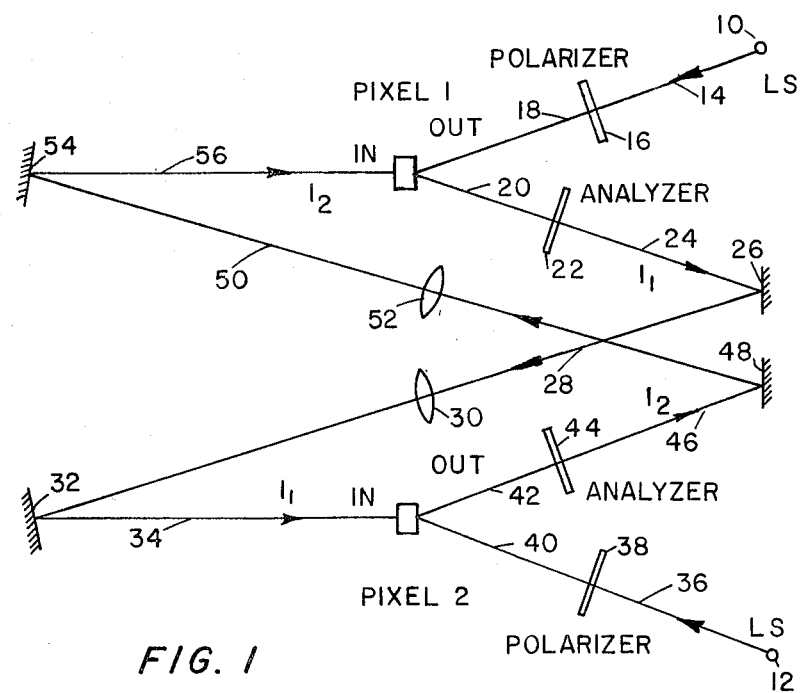
FIG. 1 is a schematic diagram of a device according to the invention.

Referring to FIG. 1, a schematic representation of one operational aspect of a bi-stable system and device according to the invention is revealed. The representation shown is one concerned with the interaction of two pixels (shown in exaggerated form) of an active optical spatial element present as a Spatial Light Modulator (SLM) as such a device performs within a feedback concept. Accordingly, the representation is one concerning only a single channel within an available large number of channels, that number of which equals the number of independent resolution cells within the area of a typical SLM. The term "pixel" as used herein is intended to concern an incremental optical image resolution element within the SLM and will be present in size on the order of, for example, one to one hundred wave lengths of the light within the path geometry of the system. This size generally will be determined by the structure of the entire optical system, that system being, in effect, divided into these resolution elements. The figure shows spaced representative collimated light sources 10 and 12 which may derive from one or more contiguously positioned optical logic devices within a given computational region. It should be understood that a single general source of light may be utilized. Light from source 10 is channeled along a ray path represented by line 14 through a polarizer 16 which carries out a linear polarization of the impinging radiation, for example in the E-plane, which is directed along ray path 18 to the output side of a pixel, designated "Pixel 1", of a Spatial Light Modulator. For the instant consideration, this SLM may be one constructed in the parallel (untwisted) nematic alignment and operative in a reflective mode. With such paralled nematic alignment, in the absence of an electric field asserted thereupon, all of the liquid-crystal molecules of the device are parallel to one another and generally parallel to its transparent face. Such SLMs are described in more detail later herein.

Depending upon the operational condition of pixel 1, the E-plane polarized light impinging thereupon from path 18 is reflected along ray path 20 through an analyzer 22 which is arranged within the system in a cross polarizing (90°) orientation with respect to polarizer 16. Depending upon the polarizing influence at pixel 1, light from path 20 is passed through analyzer 22 along ray path 24 impinge upon and reflect from reflective surface or mirror 26 at an intensity labeled "$I_1$". From surface 26, the light is reflected along ray path 28, through lens 30 and to reflective surface or mirror 32 and, thence, along path 34 to the input side of a pixel labeled, "Pixel 2".

In symmetrically geometric fashion, light emanating from light source 12 passes along ray path 36 and through polarizer or E-plane polarizing filter 38 at which position it is linearly polarized, for example along the E-plane and from which it passes along ray path 40 to the output side of pixel 2. Depending upon the operational condition of pixel 2, light is reflected therefrom along path 42 to pass through analyzer or cross polarization filter 44. Again, depending upon the operational status of pixel 2, light of intensity, $I_2$, passes from analyzer 44 and along ray path 46 to reflective surface or mirror 48. From surface 48, this light is reflected along path 50 through lens 52 to the reflective surface or mirror 54. From surface 54, light is directed along path 56 to the input side of the SLM at pixel 1.

The feedback nature of the path geometry thus described provides for a control over the polarizing output of pixel 1 in response to the intensity, $I_2$, of input radiation thereto. Conversely, the output polarizing effect of pixel 2 is controlled by the intensity, $I_1$, of the input thereto from along path 34, as determined by the output of pixel 1 and analyzer 22. The operation of pixels 1 and 2 is such that light reflected from their outputs as at 20 and 42 is affected by the feedback light asserted at their inputs as along respective paths 56 and 34. Consequently, by controlling the presence or value of the intensity of light at the inputs to the pixels, an alteration of output state will ensue. Lenses 30 and 52 are present within the system for the purpose of imaging the output of pixels 2 and 1 at the respective inputs of pixels 1 and 2.

Figure 2:
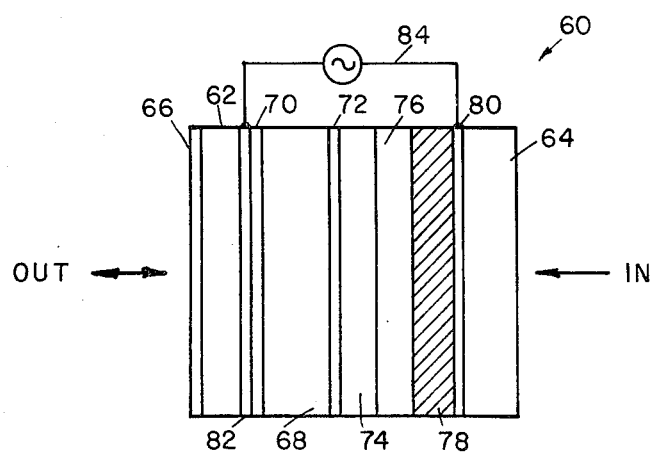
FIG. 2 illustrates the structure of an SLM.

Looking to FIG. 2, the structure of a typical SLM is represented generally at 60. It should be understood that such devices may be fabricated having a wide variety of configurations and corresponding operational characteristics. For the instant representation, the SLM consists of a number of thin film layers sandwiched between two glass substrates, the latter being represented at 62 and 64. Substrate 64 is at the input or writing light side of device 60, while substrate 62, the outer surface of which carries an anti-reflection coating 66, is positioned at the output or projection side. The operational components of the device include a nematic liquid crystal 68 having a controllable birefringence which is positioned between chemically inert insulating layers, for example formed of $SiO_2$, as at 70 and 72. A dielectric mirror 74 is positioned adjacent insulating layer 72 and a light blocking layer 76 separates the liquid crystal layer 68 from a photoconductor layer 78 formed, for example, as a CdS-Col Te composite. Two outer, thin film indium-tin oxide transparent electrodes 80 and 82 enclose the active components and these electrodes are coupled through an a.c., low voltage power supply represented by a circuit 84. When utilized in conjunction with the bi-stable or multi-stable devices of the invention, the operational surface extent of SLM 60 permits the development of a great number of optical channels or regions, the area extent of each of which defines a corresponding pixel. The operational characteristics of SLMs 60 depend upon their particular structure, that shown at 60 being operational in a reflective mode. Among the parameter controlling their operation is the bias asserted from circuit 84, the intensity of light, which light may be either coherent or incoherent, and the nematic and other characteristics of liquid crystal 68, as well as its thickness. Such characteristics are described in publications X–XIV identified above, as well as in the discourse to follow. For some applications, light within the feedback path is treated in order of the active optical elements to perform requisite operations at their inputs. For example, image converters may be called for to treat the feedback light. The geometry of the device represented in FIG. 1 is intended for use in conjunction with an SLM incorporating a liquid crystal layer constructed in the parallel (untwisted) nematic alignment. With such an arrangement in the absence of an electric field, all of the liquid crystal molecules are parallel to each other and to the transparent electrode face. In the embodiment of FIG. 1, each pixel of the SLM, together with that pixel's respective polarizer and analyzer, exhibits a characteristic input-output response behavior which, for pixel 1, is represented by curve 86 in FIG. 3. Response curve 86 corresponds to a portion of the transmission curve, $T_p \sim \sin^2(\pi d \Delta n/\lambda)$, where $T_p$ is the output transmission coefficient through the polarizer 16-pixel 1-analyzer 22 set, d, is the liquid crystal film thickness, $\lambda$, is the optical wavelength, and $\Delta n$, is the difference between the refractive indices along the fast and slow axes of the birefringent liquid crystal, as described at 68 in connection with FIG. 2. The birefringence, $\Delta n$, of liquid crystal 68 is a monotonic function of the a.c. bias voltage (electric field) and the input light intensity. Thus, the output intensity of a pixel is similar to a sine-squared function of the intensity of the input thereto. It has been observed that altering the a.c. bias voltage permits the development of an input-output response curve corresponding to differing portions of such sine squared curve.

The optical feedback geometry depicted in FIG. 1 endows the device represented thereby with stable and unstable equilibrium states, which, as is developed in the discussion to follow, permits a bistable or multi-stable performance suited for broad application in information processing procedures. Referring to FIG. 1, a stable state of operation for the device is provided wherein a beam of light from light source 10 passes along path 14 to be linearly polarized at polarizer filter 16. Assuming the input to pixel 1 at path 56 to be of higher intensity or "bright", the pixel operates in accordance with the characteristic represented at curve 86 in FIG. 3 such that the reflected output therefrom along path 20 is unchanged and is blocked at analyzer 22. The resultant intensity, $I_1$, at the input path 34 of pixel 2 is low or "dark". Correspondingly, the beam of light from light source 12 passing along path 36 is linearly polarized at polarizer 38 whereupon it impinges upon the output face of pixel 2. Pixel 2 performs in accordance with characteristic curve 88 in a manner wherein the incoming radiation is eliptically polarized and reflected along path 42 to impinge upon analyzer 44. Analyzer 44 passes substantially all of the impinging radiation or light, now represented as having an intensity, $I_2$, along path 46. The resultant light at intensity, $I_2$, is directed along path 56 to the input of pixel 1. A resultant self consistent situation thus is derived, a "bright" input at pixel 1 resulting in a "dark" output. The latter results in a "bright" output at pixel 2 which, in turn, had generated the pixel 1 "dark" output. An opposite, stable state obtains with an alteration of the input light intensity to either of pixels 1 or 2 as is discussed in more detail herein.

Considering the general theory of operation of the device represented in FIG. 1, the intensity, $I_1$, of the beam reflected from pixel 1 and passing analyzer 22 as controlled by input light intensity, $I_2$, establishes itself by means of a relaxation process described by the equation:

$$\tau(dI_1/dt) + I_1 = \Psi(I_2) \tag{1}$$

The constant, $\tau$, expresses the relaxation time or that interval required for the intensity to assume a given fixed value. Those skilled in the art will recognize that, for a given system, the value, $\tau$, may exhibit variation with respect to rising and falling intensity transitions. This, of course, will be found not to detract from system performance. For the device represented, for a given control beam intensity, $I_2$, there becomes a reflected beam intensity, $I_1$. The detailed form of $\Psi$ depends upon the structure utilized for the SLM 60 together with the analyzer 22. The pixel 2 operation is representedly a similar expression describing relaxation process which may be represented by the equation:

$$\tau(dI_2/dt) + I_2 = \Psi(I_1) \tag{2}$$

The principal expression governing an optical feedback system having the attributes of that depicted schematically in FIG. 1 may be represented by an association of equations (1) and (2) which combination is reproduced as follows:

$$\tau(dI_1/dt) + I_1 = \Psi(I_2) \tag{3a}$$

$$\tau(dI_2/dt) + I_2 = \Psi(I_1) \tag{3b}$$

Expressions (3a) and (3b) represent a system of two simultaneous first order differential equations which have a well known geometrical description in terms of a vector field defined in the plane coordinated by $I_1$ and $I_2$. A given solution to the equations (3a) and (3b) may be represented by a curve through a given set of vectors and the qualitative features of the solutions are determined by the singularities of the vector field. The singularities, singular points, or steady state conditions, are characterized in exhibiting no time-dependent variations in light intensity and, thus, by the expression:

$$dI_1/dt = dI_2/dt = 0 \tag{4}$$

As is apparent, expression (4) corresponds to the equilibrium configurations of the optical device of FIG. 1 and its structural equivalents.

The operational utility of the bi-stable or multi-stable devices of the invention may be established by the following investigation into the location, type and number of vector field singularities which exist in the $I_1$-$I_2$ plane and which of such singular points or equilibrium states are stable. Stability must be achieved with respect to all perturbations to avoid drifting of the system from any given established equilibrium state. Further, it is necessary to determine the technique by which the bi-stable or multi-stable system is induced to make transitions between stable equilibrium states through appropriate control over selected parameters represented, implicitly, within differential equations (3a) and (3b) and discussed later. Such alteration will qualitatively change the phase portrait of the system and thereby force it into a desired equlibrium state. In this regard, it is necessary to determine the phase portrait (set of evolutionary orbits in the $I_1$-$I_2$ plane) of those differential equations for a given set of control parameters.

Looking initially to the determination of the equilibrium states of the system or device of the invention, it may be observed that equilibrium configurations are characterized by intensities which become constant and thus are independent of the relaxation process described earlier. Consequently, such equilibrium configurations or states are simultaneous solutions of the equations: (5a)

$$I_1 = \Psi(I_2) \quad (5a)$$

$$I_2 = \Psi(I_1) \quad (5b)$$

Letting the terms $I_{1o}$, $I_{2o}$, represent intensity values when equilibrium has been reached, a solution to equations (5a) and (5b) may be expressed by a given point in the $I_1$-$I_2$ coordinated state space of the feedback system. Such a point is obtained from the intersection of the graph of the two relationships represented at expressions (5a) and (5b). For a suitable response function, as for example, curves 88 and 86 (FIG. 4) one may obtain two asymmetric and one or more symmetric equilibrium states. In the latter regard, the two asymmetric equilibrium states refer to the two stable states of the system wherein, for example, pixel 1 exhibits a bright input and corresponding dark output through analyzer 22, while pixel 2 exhibits a dark input and a bright output through analyzer 44 (stable state B in FIG. 4). On the other hand, symmetric equilibrium states (state C in FIG. 4) exist where both pixels 1 and 2 have identical input and output conditions which will be found under conditions to be specified below to represent an unstable condition. Many equilibrium states are available with the system if the response of one of the pixels has a suitable form. In this regard reference is made to FIG. 5 where a pixel having an alternate response function 90 with the earlier described response function represented by curve 88 in FIG. 4. Generally, SLMs with a "parallel" nematic configuration will achieve the type of characteristic response described by curve 90.

A perturbational analysis of the system in the neighborhood of the equilibrium state ($I_{1o}$, $I_{2o}$) may be utilized to determine, if the optical feedback system is in an equilibrium state, whether it will return to that state after it is perturbed slightly. Conversely, should the feedback arrangement force the system further away from an equilibrium condition, a lack of stability of the equilibrium state will be in evidence. A slight perturbation condition away from stable or unstable equilibrium is captured by the following expression equations:

$$I_1(t) = I_{1o} + \xi_1(t) \quad (6a)$$

$$I_2(t) = I_{2o} + \xi_2(t) \quad (6b)$$

Figure 3:
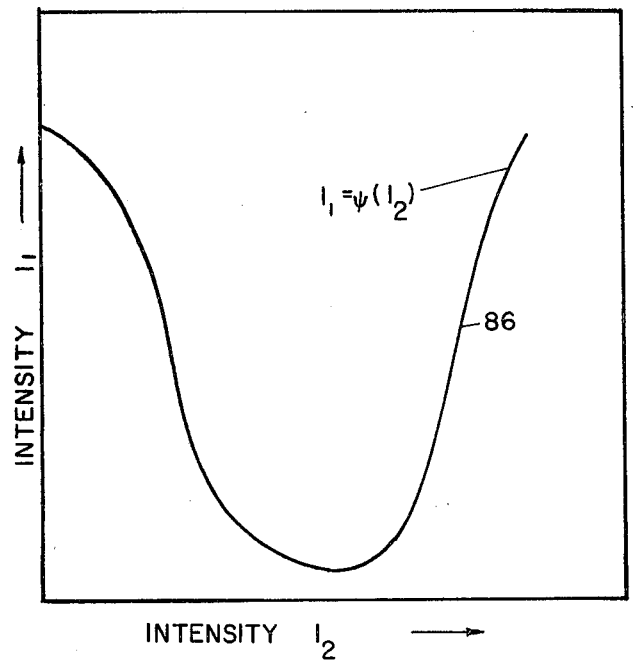
FIG. 3 shows the input-output characteristics of a pixel of FIG. 1.
Figure 4:
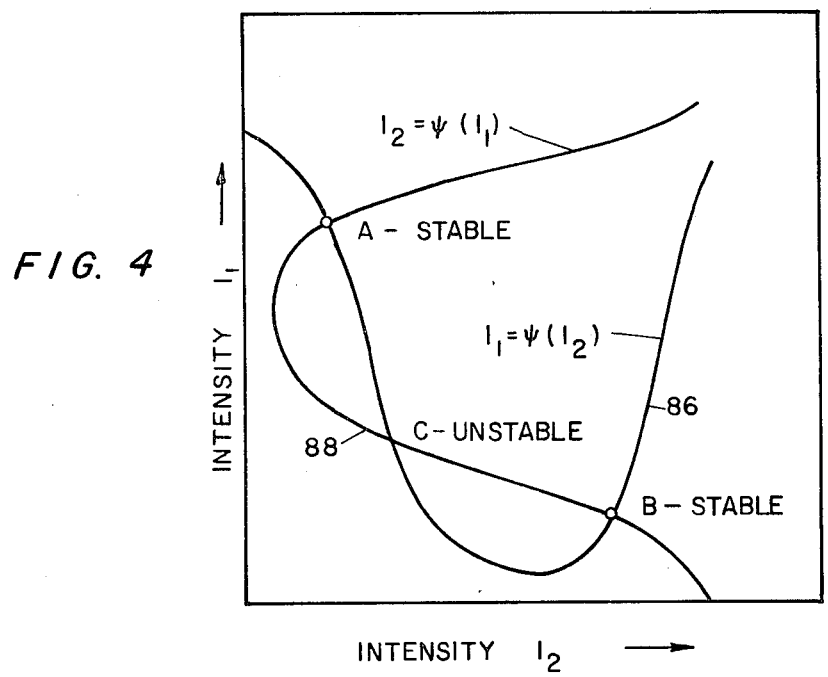
FIG. 4 shows the response curves of the pixels of FIG. 1.

In these equations the functions $\xi_1(t)$ and $\xi_2(t)$ refer to small, time-dependent intensity deviations away from the equilibrium state values, $I_{1o}$, $I_{2o}$. By substituting expression (6a) and (6b) into equations (3a) and (3b) expanding $\Psi$ to first order around ($I_{1o}$, $I_{2o}$), and using the equilibrium equations of expression (5a) and (5b) for $I_{1o}$ and $I_{2o}$, an expression describing how the perturbations in intensity are changing at points away from the equilibrium condition is developed. This expression is as follows:

$$\tau \frac{d}{dt} \begin{pmatrix} \xi_1(t) \\ \xi_2(t) \end{pmatrix} = \begin{bmatrix} -1 & \psi_2' \\ \psi_1' & -1 \end{bmatrix} \begin{pmatrix} \xi_1(t) \\ \xi_2(t) \end{pmatrix} \quad (7)$$

where:

$$\psi_1' = \frac{d\psi(I_1)}{dI_1} \bigg]_{I_{1o}} \quad (8a)$$

$$\psi_2' = \frac{d\psi(I_2)}{dI_2} \bigg]_{I_{2o}} \quad (8b)$$

are the derivatives of $\Psi(I_1)$ as represented, for example, by curve 88 and $\Psi(I_2)$ as represented, for example, by curve 86, evaluated at the equilibrium state ($I_{1o}$, $I_{2o}$). The nature of the matrix of expression (7) determines whether or not a stable or unstable equilibrium state exists. The matrix elements representing the derivatives of the response curves of FIGS. 3 and 4 are evaluated precisely at the equilibrium intensities. The local stability of the equilibrium state ($I_{1o}$, $I_{2o}$), i.e. the stability in the neighborhood of the equilibrium singularities, is governed by the eigenvalues of the matrix. An evolution of the system readily is discussed in terms of the eigenvectors of the matrix $$\begin{bmatrix} -1 & \psi_2' \\ \psi_1' & -1 \end{bmatrix}$$

of expression (7). In accordance with convention, an eigenvector is a vector that is not changed by a matrix except for a proportionality factor, that factor being called an eigenvalue.

The secular equation, i.e. the condition which guarantees that $\xi_1(t)$ and $\xi_2(t)$ are indeed the components of an eigenvector for an eigenvalue of the above matrix, is represented by the following expression:

$$(\lambda + 1)^2 - \Psi_1' \Psi_2' = 0 \quad (9)$$

where $\lambda$ represents the eigenvalue itself. Equation (9) is quadratic in nature and has therefore two solutions which are set forth as follows in conjunction with their corresponding eigenvectors:

$$\lambda_+ = -1 + (\psi_1' \psi_2')^{\frac{1}{2}} : \begin{pmatrix} \xi_{1+} \\ \xi_{2+} \end{pmatrix} = \begin{pmatrix} \psi_2' \\ (\psi_1' \psi_2')^{\frac{1}{2}} \end{pmatrix} \quad (10)$$

$$\lambda_- = -1 - (\psi_1' \psi_2')^{\frac{1}{2}} : \begin{pmatrix} \xi_{1-} \\ \xi_{2-} \end{pmatrix} = \begin{pmatrix} \psi_2' \\ -(\psi_1' \psi_2')^{\frac{1}{2}} \end{pmatrix} \quad (11)$$

The eigenvalues set forth in expressions (10) and (11) indicate whether the perturbations away from an equilibrium state will grow in time or whether the system will return to a steady state and, thus, whether the system is to be unstable or stable. If the optical device or system is perturbed from its equilibrium in such a way that the initial perturbations are away from the equilibrium intensities ($I_{1o}$, $I_{2o}$), then the perturbation will evolve. In the evolving perturbation, an eigenvector solution to expression (7) has the form:

$$\begin{pmatrix} \xi_{1\pm}(t) \\ \xi_{2\pm}(t) \end{pmatrix} \tag{12}$$

$$= C_{\pm} \exp\left[-1 \pm (\Psi_1'\Psi_2')^{\frac{1}{2}}\right] \frac{t}{\tau} \begin{pmatrix} \Psi_2' \\ \pm (\Psi_1'\Psi_2')^{\frac{1}{2}} \end{pmatrix}$$

where the constants, $C_{\pm}$, specify the magnitude of the initial eigenvectors. That is, the constants are representative of the magnitude of the initial perturbation away from equilibrium. A general perturbation may be represented as a linear superposition of these two solutions.

Figure 5:
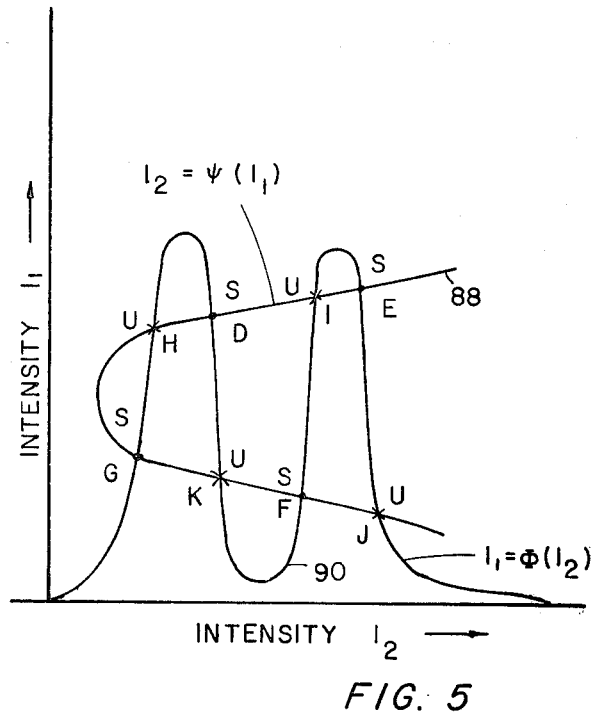
FIG. 5 represents an alternate pixel response function.

As indicated earlier herein, the singular points of the system, or the static equilibrium states, are the solutions of the simultaneous equations represented by expressions (5a) and (5b). A graphical solution to these equations is illustrated in FIGS. 4 and 5 for two different SLM - optical path combinations. Equilibrium states for the system may be represented by intersections of the two response curves 86 and 88 in FIG. 4 or 88 and 90 in FIG. 5. The stability of these equilibrium states, a condition necessary for the bi-stable or multi-stable utilization of the system, depends upon the nature of the above-described time-dependent perturbations away from equilibrium states. A stability criterion may be inferred directly from the eigenvalues occurring in the exponential of the solutions presented in expression (12) and may be expressed as follows:

$$\Psi_1'\Psi_2' < 1 \rightleftharpoons \text{stable equilibrium} \tag{13}$$

$$\Psi_1'\Psi_2' > 1 \rightleftharpoons \text{unstable equilibrium} \tag{14}$$

Recall that the values of $\Psi_1'$ and $\Psi_2'$ are determined in accordance with the criteria of expressions (8a) and (8b) above which are the derivatives of the response curves as at 86 and 88 or 88 and 90 at some static equilibrium state ($I_{1o}$, $I_{2o}$). Expressions (13) and (14) may be seen to represent respectively a stability or an instability criterion for the system.

Stable equilibrium, in general, is characterized by complex eigenvalues with negative real parts, as opposed to imaginary parts. The decaying aspect of the system is controlled by the negativeness of the real part. Although the corresponding eigenvectors are, in general, complex, the perturbations, $\xi_1$ and $\xi_2$, when utilized to describe actual optical device performance, would be real. It follows that a real perturbation away from an equilibrium state is not particularly described by the two complex eigenvectors represented in association with the eigenvalues in expressions (10) and (11). Instead, such real perturbation may be expressed by the two real linear combinations:

$$C_1 e^{-\frac{t}{\tau}} \begin{pmatrix} \Psi_2' \cos \omega t \\ -\omega\tau \sin \omega t \end{pmatrix} \tag{15}$$

$$C_2 e^{-\frac{t}{\tau}} \begin{pmatrix} \Psi_2' \sin \omega t \\ \omega\tau \cos \omega t \end{pmatrix} \tag{16}$$

The sum of these two real linear combinations may be expressed as follows:

$$\begin{pmatrix} \xi_1(t) \\ \xi_2(t) \end{pmatrix} = Ce^{-\frac{t}{\tau}} \begin{pmatrix} \Psi_2' \sin(\omega t + \delta) \\ \omega\tau \cos(\omega t + \delta) \end{pmatrix} \tag{17}$$

This vector expresses the most general perturbation whose initial phase is, $\delta$, and whose initial amplitude is determined by C. The tip of this vector, the representative point of the instantaneous state, executes a spiraling motion around and toward the equilibrium state from which the optical device was perturbed, as represented, inter alia, by the presentation within FIG. 6. A perturbation away from the equilibrium state may oscillate around that equilibrium with the frequency:

$$\omega = (1/\tau) \cdot |\Psi_1'\Psi_2'|^{\frac{1}{2}} \tag{18}$$

and decays toward it with relaxation time, $\tau$. The rotative sense of the spiraling motion is determined by the sign of the appropriate derivatives, $\Psi_1'$, $\Psi_2'$, as determined at the stable equilibrium state in question.

FIG. 4 reveals the graphical determination of equilibrium states for curves 86 and 88, two stable states, A and B being revealed in conjunction with an unstable state, C. Similarly, in FIG. 5, the criteria set forth by the equations (5a) and (5b) taken in conjunction with expression (13) and (14) show, by comparing derivative signs, that intersection points, D, E, F and G represent stable equilibrium singularities while intersections H, I, J and K represent unstable posture for the system. The characteristic curve 90 of the first pixel comprises, in order of increasing $I_2$, a first ascending segment, wherein $I_1$ increases with increasing $I_2$, a first descending segment, wherein $I_1$ decreases with increasing $I_2$, a second ascending segment and a second descending segment. The characteristic curve 88 of the second pixel comprises, in order of increasing $I_1$, a descending segment, wherein $I_2$ decreases with increasing $I_1$, and an ascending segment wherein $I_2$ increases with increasing $I_1$. Both the descending and ascending segments of curve 88 intersect all four segments of the curve 90 producing eight intersections D–K. As indicated above, the description of the dynamics of the feedback system of the invention is given by orbits, parameterized by time in the state space coordinated by intensities, $I_1$ and $I_2$; and the vector field, $dI_1/dt$, $dI_2/dt$, which is tangent to these orbits.

Figure 6:
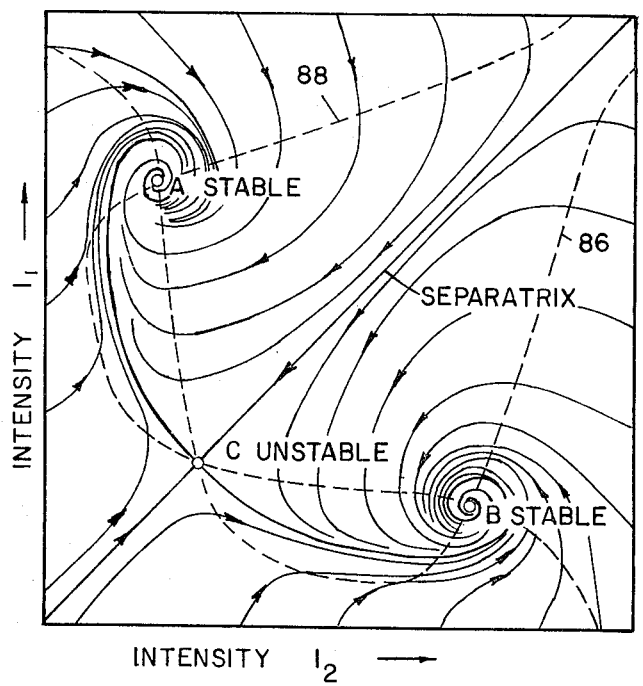
FIG. 6 illustrates evolution of the systems intensities.

Referring to FIG. 6, the $I_1$-$I_2$ coordinate plane is seen to remain the same as in FIG. 4. Response curves 86 and 88, now shown dashed, have been included in the figure to locate equilibrium states, A, B and C. Through each nonequilibrium point of the $I_1$-$I_2$ coordinate plane there is an orbit that describes the evolution of the feedback system. If the system is in the region of influence of state A or state B above or below the separatrix running at a 45° angle, then the system will decay, generally in an oscillatory way, toward equilibrium state A or B, state C being unstable.

Unstable equilibrium states have at least one eigenvalue that has a positive real part. Indeed, reference to equations (10), (11) and (12) shows that an unstable equilibrium state has $\Psi_1'\Psi_2' > 1$ [equation (14)] so that one eigenvalue is positive and the other one is negative. This indicates that the perturbed motion of the representative point of the optical device is unstable or stable if that point were confined along the respective directions of the eigenvectors. Thus, an unstable equilibrium state is characterized by a saddlepoint.

The state space portraits additionally are assembled in view of two additional observations which can be made about the qualitative behavior of simultaneous equations (3a) and (3b) as they govern the motion of a representative point of the optical device in the $I_1$-$I_2$ plane.

The first observation is that there is no periodic motion, i.e., there are no closed paths. This observation follows from Bendixon's (see publication XV below) criterion applied to equations (3a) and (3b) wherein the quantity:

$$(\partial/\partial I_1)[-I_1+\Psi(I_2)]+(\partial/\partial I_2)[-I_2+\Psi(I_1)]=-2 \qquad (19)$$

does not change its sign in the $I_1$-$I_2$ plane. The second observation is that the phase paths are directed from infinity inward. This follows from the fact that $\Psi(I_2)$ and $\Psi(I_1)$ tend respectively, to a constant, for large intensity values, so that equations (3a) and (3b) assume the form:

$$\tau(dI_1/dt) \approx -I_1 \qquad (20a)$$

$$\tau(dI_2/dt) \approx -I_2 \qquad (20b)$$

The above expressions show that, very far from equilibrium, the rate of change of intensity is always proportional to the negative of the intensity and, therefore, a tendency to return to equilibrium is always present. As indicated above, all of the possible evolutions of the intensities of the system follow system spiral orbits or trajectories toward equilibrium points in the manner typically graphically represented in FIG. 6.

Switching from one stable state to another involves a change of the pixel-light intensity relationship such that the system tends to alter from one stable state to another. Concerning such transitions of the system between its stable equilibrium states, should the optical device retaining the system be in one given equilibrium state, the technique for altering it or forcing it to another equilibrium state involves changing certain control parameters, thereby bringing about a catastrophic change in the phase portrait. The term catastrophic in this instance is intended to be considered in the sense that the transient phase portrait will be altered so as to lack one equilibrium state while retaining the other, i.e. catastrophic change is one having the effect wherein a given control parameter is so manipulated that the system transitions from the region of control of one stable equilibrium point to the region of control of a different stable equilibrium point (see publication XV below). A variety of techniques effecting such changes is available, e.g. augmenting, diminishing or blocking pixel input light intensities. Such a change may be accomplished by momentarily (transiently) changing the light intensity of one light input side of a given pixel.

As a first example, should the light intensity, $I_2$, applied to the input side of pixel 1 (FIG. 1) be altered by a fixed amount, $\Delta$, expressions (3a) and (3b) will alter as follows:

$$\tau(dI_1/dt)+I_1=\Psi(I_2+\Delta) \qquad (21a)$$

$$\tau(dI_2/dt)+I_2=\Psi(I_1) \qquad (21b)$$

It follows, that the new equilibrium states of the system are determined by the points of intersection defined by the following expressions:

$$I_1=\Psi(I_2+\Delta) \qquad (22a)$$

$$I_2=\Psi(I_1) \qquad (22b)$$

The value of the control parameter, $\Delta$, may be derived from an observation of the space portrait of FIG. 6, an intensity alteration of value sufficient to cross the separatrix being required to cause the system to fall from the domain or region of influence of one stable state to that of the other. Approaching such a condition from another aspect, by so altering intensity, for example, response curve 86 may be considered to shift to the left by an amount, for example, $\Delta$. As a result, stable focus A disappears together with the unstable (saddlepoint) point, C if $\Delta$ is sufficiently large. Thus, assuming the system to be initially in stable state A, this locates a representative point of the system within the general neighborhood or influence of the opposite stable state, B to which the point will move in accordance with expression (21a) and (21b). Once the representative point has moved into this alternate (transient) equilibrium state, the control parameter, i.e. the change, $\Delta$, is decreased to zero and the representative point will eventually assume a stable focus, for example, B.

Figure 7:
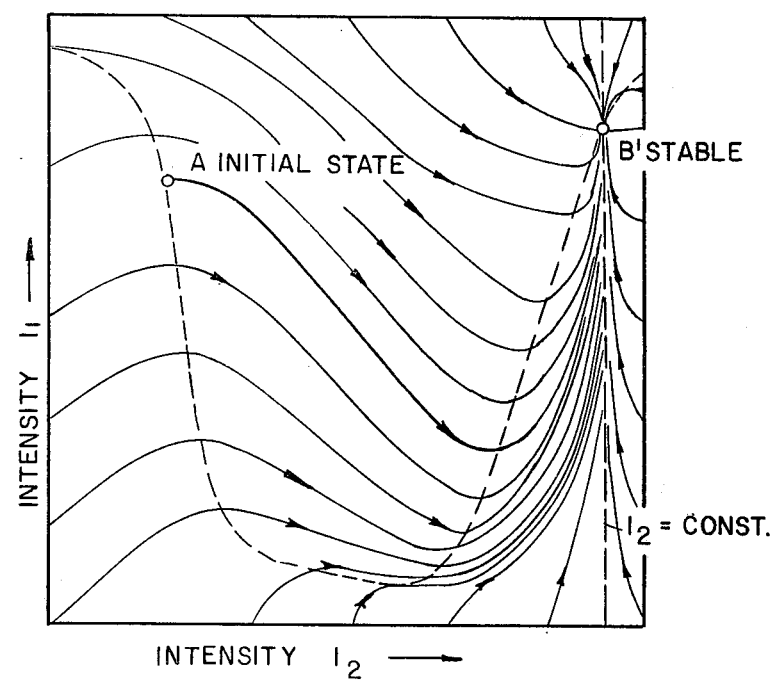
FIGS. 7 & 8 illustrate the switching of a pair of pixels from one stable state to another.
Figure 8:
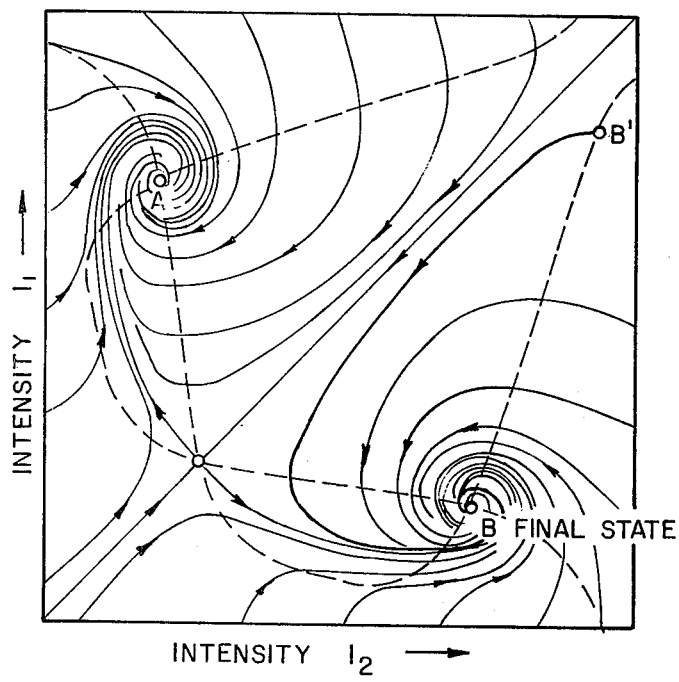

As a second example, and looking additionally to FIGS. 7 and 8, the switching of paired pixels 1 and 2 from one stable state to another is depicted graphically. Assuming the system exists initially in state A and is to be switched to state B, the feedback loop extant at intensity, $I_1$, and leading to the input of pixel 2 from ray path 34 is temporarily blocked. The equilibrium equations of the intensity response curves, now analogs of equations (5a) and (5b), now become:

$$I_1=\Psi(I_2) \qquad (23a)$$

$$I_2=\Psi(0)=\text{constant} \qquad (23b)$$

Under these conditions the system will evolve toward the intermediate stable state, B', whose location is in the region of influence of the former state, B. The boldface curve within FIG. 7 is the orbit or trajectory of the system from the initial state, A, to the intermediate state, B' in the region of influence of former state B. FIG. 8 shows a state space portrait with feedback restored following the temporary interruption thereof as represented at FIG. 7. The boldface curve extending from position B' to B traces the decaying oscillatory orbit toward the restored final stable state, B.

For further information concerning the development of stability type diagrams as discussed above, reference is made to the following publication:

XV. Theory of Oscillators; Andronov, Vitt and Khaikin, Addison-Wesley Publishing Company, Inc. pp. 305-324.

Switching of the instant system can be carried out from any of a variety of approaches. For instance, referring to FIG. 1A, the ray paths 50 and 56 are reproduced and are shown incident upon and reflecting from a half-silvered mirror 55 which now replaces mirror 54. When light is present in path 50, half-silvered mirror 55 will reflect at least a portion of that light along path 56 to provide a "bright" input to pixel 1 in conventional fashion. However, if the input to pixel 1 is "dark", i.e., there is no light within path 50, then the system can be switched by imposing light from a switching means in the form of a light source 59 through imaging lens 57 and half-silvered mirror 55 to assert a bright input at pixel 1. This will switch the system to an opposite stable state. While this description looks only to operation in conjunction with a single pixel, such a switching arrangement can be provided wherein numerous optical channels can be selectively switched. For instance, the light source 59 may be present as an array of light emitting diodes, a cathode ray tube surface or other suitable light sources.

Figure 1A:
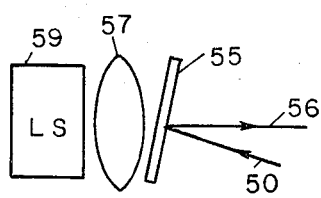
FIG. 1A illustrates a switching technique for the instant system.

It will be apparent that, for the system as schematically represented in FIG. 1 to switch between stable states, an arrangement similar to FIG. 1A will be required for use in conjunction with ray paths 34 and 28.

A variety of active optical spatial elements may be utilized within the system of the invention to achieve multi-stable performance. Such elements may be present as SLMs operating in a variety of modes, image intensifiers and the like. For those such elements selected, the foregoing theory may readily be applied.

Figure 9:
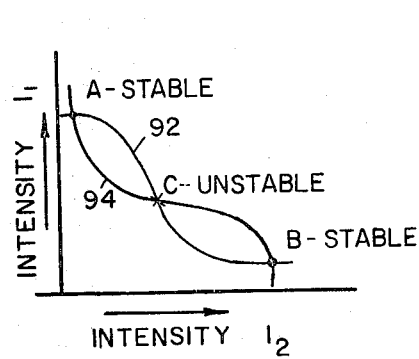
FIG. 9 is a general representation of the bi-stable operation for an alternative form of SLM.

FIG. 9 reveals a general representation of the bi-stable operation for an alternate form of SLM or an alternate operation of an SLM. For example, an intensity function, $I_1 = E(I_2)$, is represented at curve 92, while, for a system corresponding with the arrangement in FIG. 1, a second pixel may provide characteristic intensity curve, $I_2 = E(I_1)$ as represented at 94. Similar to the relationship of the curve of FIG. 4, A and B stable state intersections of these curves are labeled on the drawing as well as a C, unstable state intersection. In accordance with the theory set forth above, it may be observed that the stable nature of these singularities may be derived by an examination of the derivatives of the intersecting curves as discussed in detail in connection with expression (13) and (14). In addition to the different response curve configurations available for a given spatial light modulator, as indicated above, the level of a.c. bias asserted thereupon also may determine that portion of such characteristic curve which is utilized to achieve bi-stable or multi-stable performance, i.e. considerable flexibility is available to the designer.

Figure 10:
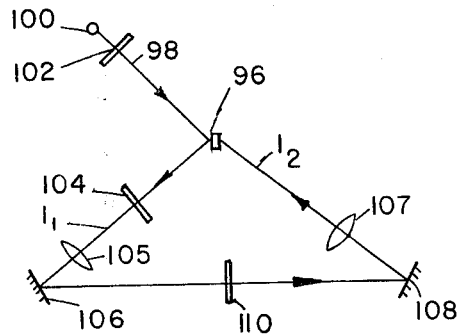
FIG. 10 is a generalized representation of the light path geometry of a system using a single pixel.

Multi-stable operation in accordance with the teachings of the invention also is available through the utilization of only one pixel as opposed to the dual pixel geometry heretofore described. The advantage of such an arrangement becomes immediately apparent, the capacity for a given spatial light modulator being doubled. Looking to FIG. 10, a highly generalized representation of the light path geometry of a bi-stable system incorporating a single pixel is represented. In the figure, a single pixel is represented at 96 which is positioned to receive light of intensity, $I_1$, along ray path 98 having been linearly polarized at polarizer filter 102. Depending upon the bias supplied and the operational characteristic of the SLM within which pixel 96 operates, beam 102 is reflected from the SLM at pixel 96 so as to pass through analyzer 104, and then pass lens 105 to be bent along a path including lens 107, mirrors 106 and 108 to the input of pixel 96. Optionally, a switching means in the form of an attenuator or amplifier may modify the feedback light intensity $I_1$ as represented by block 110.

The characteristic curve of the system including pixel 96 must be such as to at least achieve the development of a bi-stable condition. This characteristic, as before, is a function both of the bias asserted at the SLM containing pixel 96 as well as the nature of the feedback path. Additionally, it should be noted that a self consistent expression evolves by the nature of the single pixel and the influence of any intensity modifier having the characteristic, $\theta(I_1)$, as represented at block 110. As before, the principal expression governing an optical feedback having the attributes of the system depicted schematically in FIG. 10 may be represented as follows:

$$\tau(dI_1/dt) + I_1 = \Psi(I_2) \tag{24a}$$

$$\tau(dI_2/dt) + I_2 = \theta(I_1) \tag{24b}$$

As in the case of expressions (3a) and (3b) these expressions are present as a system of two simultaneous equations. For a system having the stability characteristic represented in the curves of FIG. 11A, ordinarily, $\tau'$, so approaches a zero value such that the relaxation characteristic of equation (24b) is dismissable. It may be observed that, for the dual pixel embodyments described above, $\tau'$, will equal, $\tau$. Looking to FIG. 11A, expression (24a) is represented by curve 112, while expression (24b), assuming $\theta(I_1)$ to be $I_1$ and $\tau'$ to be zero, may be expressed by the line 114 which, for this representation, is at an angle of 45° with respect to the ordinate and abcissa. The intersections of the curves reveal two stable states, A and B, along with an unstable state, C. If the term, $\theta(I_1)$, (block 110) were to function to progressively decrease intensity, the curve or line 114 will move toward the ordinate of FIG. 11A. Correspondingly, should the function block 110 be present as a light amplifier, an opposite alteration to curve 114 ensues.

Identification of the stable and unstable singularities of the combined curves 112 and 114 may be observed to follow the earlier-discussed theory concerning expressions (13) and (14). For example, the expression $(d\theta/dI_1)(d\Psi/dI_2)$, evaluated at a point of stable equilibrium, should have a value less than one. This condition may be represented as follows:

$$\theta'\Psi' < 1 \tag{25}$$

Where the function of block 110 as associated with lenses 105 and 107 is one treating the feedback path in a consistent manner, so that the function $\theta(I_1)$ above may be represented as $\alpha I_1$, $\alpha$ being constant, then expression (25), for this special care, may be written:

$$\alpha\Psi' < 1 \tag{26}$$

Figure 11A:
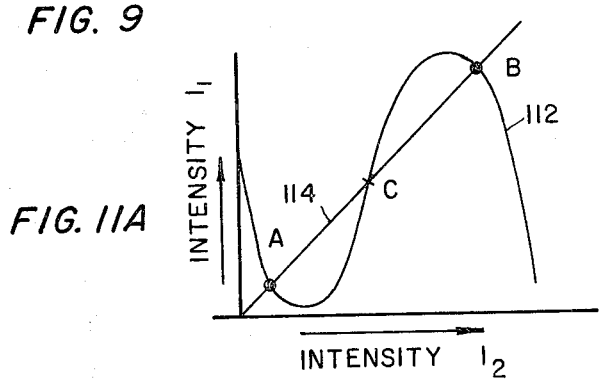
FIG. 11A illustrates the stability characteristics of a system of the invention.
Figure 11B:
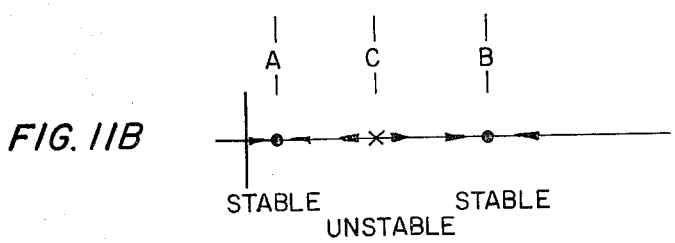
FIG. 11B shows a state space portrait corresponding with FIG. 11A.

As a rule of thumb, where the derivatives of the two curves are of opposite sign at a point of their intersection, a stable condition is defined, whereas, if the derivatives are of the same sign and have a product larger than unity, at such intersection, the condition is one unstable in nature. A state space portrait corresponding with the system of FIG. 11A is one dimensional and is represented at FIG. 11B which is readable in conjunction therewith.

Figure 12:
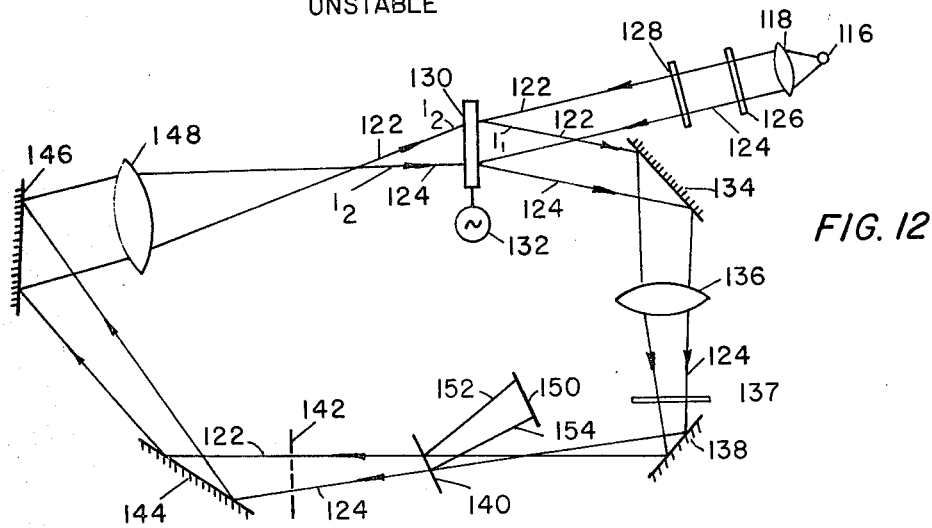
FIG. 12 illustrates a specific implementation of a system of the invention.

A more specific implementation of the single pixel embodiment of the invention is represented in FIG. 12. In that figure, a mercury arc lamp is provided as a light source 116, the output of which is collimated by lens 118. Upper and lower ray paths 122 and 124 are shown emanating from lens 118 and passing a 5461Å (green) filter 126 and linear polarizer filter 128. Light within paths 122 and 124 impinges upon an SLM 130 which is selectively biased from a.c. source 132 and operates in a reflective mode. Beams 122 and 124 selectively reflect from SLM 130, thence are reflected from the surface of mirror 134 and undergo a right-to-left reversal through imaging lens 136. From lens 136, the light passes analyzer 137 is reflected from the surface of mirror 132 to extend through beam splitter 140 and selectively pass a blocking mask 142. From mask 142, the path rays are reflected from the surfaces of mirrors 144 and 146, whereupon their right-to-left sense is reversed at lens 148 to effect the impingement of light from ray path 122 at the input side of a thus defined pixel within SLM 130. This impingement is located adjacent to the output side of SLM 130 which receives light from an earlier portion path leading from source 116. Similarly, path 124 extends to the input side of SLM 130 at a location corresponding with the impingement thereupon of ray path 124 as it extends from the same light source. A viewing screen 150 is positioned with respect to beam splitter 140 so as to permit an observation of the intensities represented along light paths 122 and 124 from corresponding respective sampling paths 152 and 154.

As discussed above by providing a switching means for blocking the feedback path represented either at 122 or 124, a change in stable condition of the system will be evolved. Alternately, the stable states may be exchanged by providing a switching means in the form of a beam of light at the input side of SLM 130 where the feedback path, I$_2$, leading thereto is in a "dark" state. Of course, an intensity modifier as discussed earlier in connection with block 110 may be incorporated within the system of FIG. 12. Where such intensity modifier is not utilized, $\theta(I_1)$ is, I$_1$.

Figure 13:
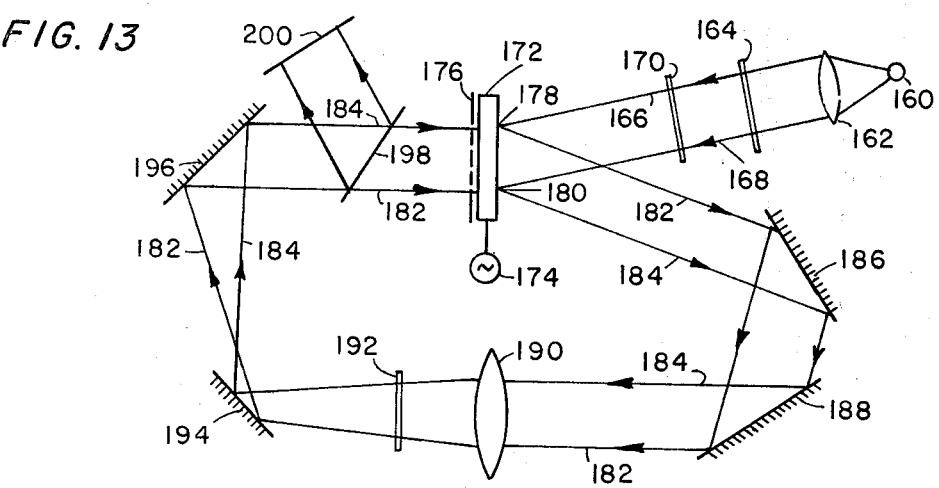
FIG. 13 illustrates a bi-stable system according to the invention.

To demonstrate the operation of multistable devices according to the invention, a bistable system, as schematically represented in FIG. 13, was tested utilizing a spatial light modulator constructed in the parallel (untwisted) nematic alignment and marketed by Hughes Corp., California. This SLM incorporated a cadmium sulfide light sensitive layer, as described earlier in connection with FIG. 2 at 78. Looking to FIG. 13, the components of this experimental arrangement as positioned upon a stable platform are revealed. A mercury lamp was utilized as a light source 160, the output of which was collimated by a positive lens 162 and filtered by a 5461-Å filter 164. The resultant green light beam, now represented by respective upper and lower ray paths 166 and 168, was linearly polarized by polarizing filter 170, whereupon the linearly polarized rays impinged upon the output side of SLM 172. Spatial light modulator 172 was provided an a.c. bias as represented schematically at 174. Through the utilization of a blocking mask 176 positioned before the input side of SLM 172, a hexagonal array of holes paired symmetrically about the center of the SLM were defined. One hole of such a pair is located by the impingement point 178 of the ray of light within path 166, while its complement is located at 180 at the impingement point of the beam within lower ray path 168. Modulator 172 carried out selective elliptical polarization in the course of the reflection of beams within ray paths 166 and 168 and functioned to reflect these beams along corresponding respective paths 182 and 184. Paths 182 and 184 were bent to be redirected to the input side of SLM 172 through the utilization of a plurality of mirrors including an initial two thereof represented at 186 and 188. Upon being reflected from mirror surface 188, the light beams passes an imaging lens 190 which functioned to image the impingement points as at 178 and 180 in a right-to-left reversal at the input of SLM 172. As light extended from lens 190, it was intercepted by an analyzer 192 having a polarizing axis orthogonally disposed with respect to that of polarizer 170. With the light path geometry shown, when beams 182 or 184 passed analyzer 192, they were reflected from the specular surfaces of mirrors 194 and 196 and directed through blocking mask 176 into the input side of SLM 172. Note, that the light reflected from impingement point 178 along path 182 was asserted as a feedback to the input of the corresponding point of impingement 180, while conversely, light impinging at 180 was reflected along path 184 to the input of SLM 172 in correspondence with impingement point 178. Thus, a pair of regions representative of pixels were defined having feedback paths derived in accordance with the bi-stable geometry schematically revealed in FIG. 1. These regions also were precisely limited by the apertures within blocking mask 176 which were viewed by auxiliary optics including a beam splitter 198 operating in conjunction with a viewing screen 200.

Figure 14A:
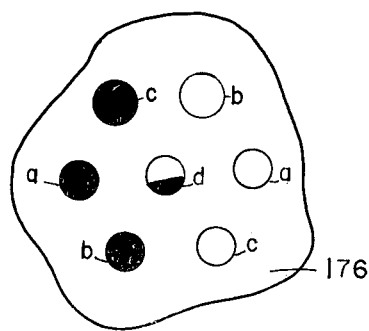
FIGS. 14A & 14B represent the images of the blocking mask of FIG. 13.
Figure 14B:
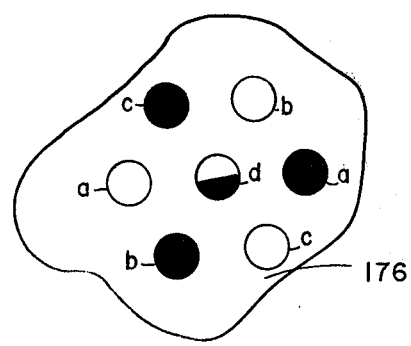
Figure 15:
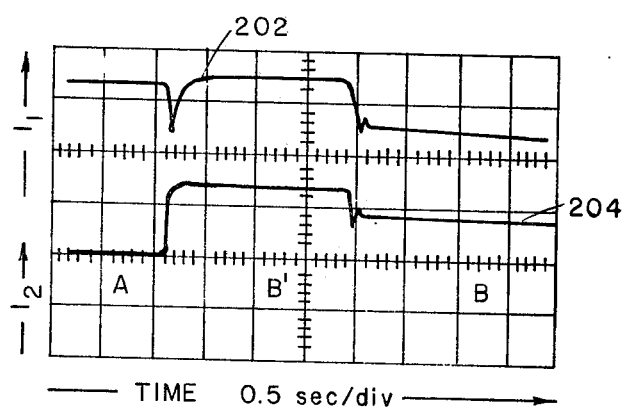
FIG. 15 shows oscilloscope traces of the pixel intensities.

Referring additionally to FIGS. 14A and 14B, representation of the images of blocking mask 176 viewed at screen 200 in the course of the operation of the system are provided. Mask 176 was formed of three pairs of spaced circular openings a—a, b—b and c—c, these openings having had a diameter of about one eighth inch. The opening pairs were symmetrically disposed about the center of mask 176 at which point an opening, d, of the same diameter, was provided. As indicated above, mask 176 served to define spots or regions representing pixels within the system and, additionally, stabilized the feedback paths against small errors in optical alignment. The existence of two stable intensity states for each of the paired regions representing pixels was observed and, by temporarily blocking the feedback loop for any given pixel region, the predicted decaying oscillations associated with the switching process were observed. Further, bi-stable operation was observed over a range of a.c. bias voltages of from 3.6 to 5.1 volts. Looking to FIG. 14A, input spots a—a are revealed as having a dark-bright intensity condition prior to the blocking of the right hand feedback input. Upon transient blocking, the stable state reversed such that the right hand spot remained dark while the left hand spot became bright as represented in FIG. 14B. Referring to FIG. 15, oscilloscope traces of the pixel intensities, I$_1$(t) and I$_2$(t) of the experimental arrangement of FIG. 13 as they were being switched are revealed. Switching to derive the traces was carried out by blocking the input to that pixel which would be represented by pixel 2 in FIG. 1. Referring additionally to FIGS. 6, 7 and 8, such blocking effects a switching from state A to state B' to state B. Note in FIG. 15 that trace 202 exhibits a high intensity, while corresponding trace 204 is dark. Upon the blocking of the intensity, I$_1$ in feedback input to pixel 2, the intensity I$_1$ of initial state A conforms with the trajectory of FIG. 7, having a low point whereupon it rises to the stable state, B'. Correspondingly, intensity I$_2$ elevates to a higher level. The latter representative point B' of the system then falls within the domain of the B stable state upon removal of the blocking, whereupon both traces 202 and 204 assume the appropriate intensities for the switched stable condition of the system.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. A multi-stable optical system, operable in conjunction with a source of light, comprising:
    active optical spatial element means having input and output sides for treating light deriving from said source at said output side to provide light at an intensity, $I_1$, in response to light at intensity, $I_2$, incident at said input side;

optical path means for directing light from said source to said active optical spatial element output side and configured to define a feedback path extending from said output side to said input side;

said active optical spatial element and said optical path means exhibiting an operational characteristic represented by the expression:

$$\tau(dI_1/dt)+I_1=\Psi(I_2)$$

$$\tau'(dI_2/dt)+I_2=\theta(I_1)$$

where $\tau$ and $\tau'$ are relaxation times.

2. The multi-stable optical system of claim 1 having equilibrium states defined by the solution of the simultaneous equations:

$$I_1=\Psi(I_2)$$

$$I_2=\theta(I_1).$$

3. The multi-stable optical system of claim 2 wherein each stable said equilibrium state thereof is present when:

$$\theta'\Psi'<1$$

where $\theta'=d\theta(I_1)/dI_1$ and $\Psi'=d\Psi(I_2)/dI_2$, each evaluated at an equilibrium state.

4. The multi-stable optical system of claim 3 including switching means situated within said feedback path for transiently altering the said light intensity, $I_2$ incident a said active optical spatial element input side by an amount catastrophic to an existing said stable equilibrium state to evoke a transformation to another said equilibrium state.

5. The multi-stable optical system of claim 4 in which said switching means is configured to transiently alter said light intensity, $I_2$, by increasing the level thereof.

6. The multi-stable optical system of claim 4 in which said switching means is configured to transiently alter said light intensity, $I_2$, by diminishing the level thereof.

7. The multi-stable optical system of claim 1 in which:

$$\theta(I_1)=\alpha I_1, \text{ and}$$

$\tau'=0$, where, $\alpha$, is a constant.

8. The multi-stable optical system of claim 2 in which:

$$\theta(I_1)=\alpha I_1,$$

$$\tau'=0,$$

and each stable said equilibrium state thereof is present when:

$$\alpha\Psi'<1,$$

where: $\alpha$ is a constant and $\Psi'=d\Psi(I_2)/dI_2$.

9. A multi-stable optical device comprising:
a first light source;
a first polarizer means for polarizing light from said first light source;
spatial light modulator means defining first and second pixels, each having input and output sides, the output side of said first pixel being situated to intercept said polarized light from said first polarizer means and to reflect said polarized light with altered polarization dependent upon the intensity of light incident upon said input side of said first pixel;
a first analyzer means situated such that said light reflected from said output side of said first pixel passes therethrough, said first analyzer means selectively absorbing said reflected light depending upon the polarization thereof;
first optical path means for directing said light passing through said first analyzer means on to said input side of said second pixel with an intensity $I_1$;
a second light source;
a second polarizer means for polarizing light from said second light source, said output side of said second pixel being situated to intercept said polarized light from said second polarizer means and to reflect said polarized light dependent upon the intensity $I_1$ of light incident upon said input side of said second pixel;
a second analyzer means situated such that said light reflected from said output side of said second pixel passes therethrough, said second analyzer means selectively absorbing said reflected light depending upon the polarization thereof;
second optical path means for directing said light passing through said second analyzer means on to said input side of said first pixel with an intensity $I_2$;
said first pixel having a characteristic curve comprising at least two ascending segments, wherein the intensity of said reflected light passing through said first analyzer means increases with increasing intensity $I_2$ of light incident upon the said input side of said first pixel, and at least two descending segments, wherein the intensity of said reflected light passing through said first analyzer means decreases with increasing intensity of light incident upon said input side of said first pixel, said ascending and said descending segments alternating in said characteristic curve of said first pixel; and
said second pixel having a characteristic curve comprising at least one ascending segment, wherein the intensity of said reflected light passing through said second analyzer means increases with increasing intensity $I_1$ of light incident upon said input side of said second pixel, and at least one descending segment, wherein the intensity of said reflected light passing through said second analyzer means decreases with increasing intensity $I_1$ of light incident upon said input side of said second pixel, said characteristic curves of said first and second pixels being such that, when both are plotted on a common $I_2/I_1$ plane, both said ascending and said descending segments of said second pixel characteristic curve will intersect said two ascending and said two descending segments of said first pixel characteristic curve, thereby defining four stable states of said device.

10. The optical device of claim 9 in which:
said first pixel, in association with said first optical path means, said first polarizer means and said first analyzer means exhibits a characteristic represented by the equation:

$$\tau(dI_1/dt)+I_1=\Psi(I_2)$$

said second pixel, in association with said second optical path, means, said second polarizer means and said second analyzer means exhibits a characteristic represented by the equation:

$$\tau(dI_2/dt)+I_2=\Psi(I_1)$$

where, $\tau$ is a relaxation time.

11. The optical device of claim 10 having equilibrium states defined by the solutions of the simultaneous equations:

$$I_1=\Psi(I_2)$$

$$I_2=\Psi(I_1).$$

12. The optical device of claim 11 wherein each stable said equilibrium state thereof is present when:

$$\Psi_1{'}\Psi_2{'}<1$$

wherein $\Psi_1{'}=d\Psi(I_1)/dI_1$ evaluated at an equilibrium state, and $\Psi_2{'}=d\Psi(I_2)/dI_1$ evaluated at an equilibrium.

13. The optical device of claim 12 including switching means for, when said device is in a given stable equilibrium state, selectively transiently altering the said light intensity, $I_2$, incident at said spatial light modulator means input side at said first pixel by an amount catastrophic to said given state to evoke a transformation to another stable equilibrium state.

14. The optical device of claim 13 in which said switching means transient alteration of said light intensity, $I_2$, is provided by means diminishing the level thereof.

15. The optical device of claim 13 in which said switching means is configured to transiently alter said light intensity, $I_2$, by increasing the level thereof.

16. A multi-stable optical device comprising:
first optical path means for directing light from a source thereof;
polarizer means for polarizing light within said first optical path means;
spatial light modulator means having input and output sides, said output side being situated to intercept polarized light within said first path means and defining a pixel therewith for altering said light polarization in correspondence with the intensity of light incident upon said pixel at said input side and reflecting said light, as altered, from said pixel at said output side;
a second optical path means for directing sid reflected light to said pixel at said spatial light modulator means input side; and
analyzer means situated within said second optical path means for polarizing light therein, and selectively accepting light therein.

17. The optical device of claim 16 in which said spatial light modulator means pixel, in association with said first and second optical path means, said polarizer means and said analyzer means, exhibits an operational characteristic represented by the expressions:

$$\tau(dI_1/dt)+I_1=\Psi(I_2)$$

$$\tau'(dI_2/dt)+I_2=\theta(I_1)$$

wherein $I_1$ is the intensity of light within said optical path means having passed through said analyzer means, $I_2$ is the intensity of light incident upon said pixel at said spatial light modulator means input side and, $\tau'$ and $\tau$ are relaxation times.

18. The optical device of claim 17 having equilibrium states defined by the solutions of the simultaneous equations:

$$I_1=\Psi(I_2)$$

$$I_2=\theta(I_1).$$

19. The optical device of claim 18 wherein each stable said equilibrium state thereof is characterized by the condition:

$$\theta'\Psi'<1$$

where $\Psi'=d\Psi/dI_2$ evaluated at an equilibrium state, and $\theta'=d\theta/dI_1$, evaluated at an equilibrium state.

20. The optical device of claim 19 including intensity modifier means situated to intercept light within said second optical path means for deriving said light at intensity, $I_2$, in correspondence with the expression:

$$I_2=\alpha I_1,$$

where, $\alpha$, is a constant.

21. The optical device of claim 19 including switching means for, when said device is in a given stable equilibrium state, selectively, transiently altering the said light intensity, $I_2$, incident at said spatial light modulator means input side at said pixel by an amount catastrophic to said given state to evoke a transformation to another stable equilibrium state.

22. The optical device of claim 21 in which said switching means includes means for diminishing the level of said light intensity, $I_2$, by an amount catastrophic to said given state.

23. The optical device of claim 21 in which said switching means includes means for transiently increasing said light intensity, $I_2$, by an amount catastrophic to said given state.

* * * * *